United States Patent [19]

Steidle

[11] 4,408,876
[45] Oct. 11, 1983

[54] METHOD AND APPARATUS FOR MICROFILMING DOCUMENTS OF VARIED LENGTH

[75] Inventor: Kurt A. Steidle, Basel, Switzerland

[73] Assignee: Motion Technology Corporation, Aston, Pa.

[21] Appl. No.: 325,349

[22] Filed: Nov. 27, 1981

[51] Int. Cl.³ .............................................. G03B 27/44
[52] U.S. Cl. ......................................... 355/54; 355/64
[58] Field of Search ............................. 355/53, 54, 64

[56] References Cited

U.S. PATENT DOCUMENTS

| | | | |
|---|---|---|---|
| 3,136,463 | 6/1964 | Froese | 355/64 X |
| 3,649,121 | 3/1972 | Cohen | 355/54 X |
| 4,197,004 | 4/1980 | Hurlbut | 355/54 X |

Primary Examiner—Richard A. Wintercorn
Attorney, Agent, or Firm—Woodcock, Washburn, Kurtz, Mackiewicz & Norris

[57] ABSTRACT

The invention concerns a process for "flow microfilming", particularly using 16mm film, where the film starts being fed synchronously with the feeding of a document to be filmed, moves forward in synchronism with the document and stops after the microfilming of the document is over. According to the invention, the stopping of the film after the document has been microfilmed is done such that the length of the film utilized each time for a given document is equal to a whole multiple of a standard minimum length, whereby the film may be automatically indexed for viewing regardless of the actual length of any given document.

1 Claim, 3 Drawing Figures

METHOD AND APPARATUS FOR MICROFILMING DOCUMENTS OF VARIED LENGTH

BACKGROUND OF THE INVENTION

It is known that the efficient filing of documents by use of microfilm is done using different techniques. One of these techniques is so-called "flow microfilming" which is normally done on continuous lengths of 16 mm film. According to this technique, one advances the unexposed film in synchronism with the document to be microfilmed. The start of the film takes place at the same time the document is fed into the microfilming camera, which continuously exposes the film, which is stopped soon after the document is microfilmed. This technique allows one therefore to microfilm documents of any length—from little cards of size less than A5, up to continuous forms from electronic data processing systems—while assuring film use limited in proportion to the length of the document. Films obtained in such a way are typically placed in the archives as they are obtained, namely in a roll, normally of 30 meters length. If such a film contains microfilmed documents of A4 size, which according to the selected reduction ratio may typically be reduced to fit onto a length of film of one centimeter, in one roll around 3000 "photograms" are contained. To later consult such photograms one must unwind a great portion of the roll. Moreover, no easy system to locate the documents to avoid very long retrieval time is provided.

To make the retrieval easier and faster as well as, under certain aspects, to enable a more flexible filing system a "microfiche" filing system is often preferred. According to this system, documents are microfilmed on a film having a size of around 10×15 cm. On such film one gets about 100 photograms from documents sized A4, using a reduction factor of around 28:1. In this case the microfilming system is essentially static: the camera is adapted to position the microfiche in one of a pre-arranged series of standard positions so as to carry out a microfilming of documents one at a time in a fixed exposure position.

This system, as already said, has the advantage of an easier and faster consultation, particularly if the filing of documents is made with reference to a progressive microfiche figure and to a reference figure diagramming the position of the photogram on the microfiche. In this way, an index is provided for each fiche giving X and Y coordinates of each document. One can then simply move the frame of interest beneath the viewing lens. There are also machines which enable the automatic reading of the microfiche, where positioning of the microfiche for reading is performed automatically by making reference to the coordinates of the photogram on the machine.

However, this system has not the flexibility of the "flow microfilming" system described above because it does not allow the microfilming of documents having a length longer than the standard size—e.g., A4—for which the machine was pre-set.

An intermediate solution, which is becoming increasingly popular is the system of microfilming initially with a flow camera, that is, one using continuous reels of film, and afterwards to cut the film into lengths of standard dimension, e.g., 14 cm, and insert them in the channels of jackets, which are transparent envelopes manufactured to contain said film cuttings. Such jackets while having dimensions equal to the microfiche size, cannot be examined in the automatic reading machines above mentioned because, due to use of the flow microfilming system, the position of the photograms does not coincide with the standard coordinate-located reading positions foreseen on the machine, due to the size variation of the microfilmed documents.

OBJECTS OF THE INVENTION

It is an object of this invention to solve the problem of reading documents of varied lengths in jackets using microfiche automatic reading machines by means of an improved flow microfilming system.

Another object of the invention is to provide a system for automatically-accessible microfiche storage of documents of varying length.

SUMMARY OF THE INVENTION

The present invention satisfies the needs of the art and objects of the invention mentioned above by provision of a flow microfilming system of the kind already mentioned, in which the film is advanced beginning at the moment of the document feeding into the camera, is kept moving in synchronism with the advance of the document, and is stopped soon after the document has been microfilmed, but which is characterized by the fact that the film stopping takes place such that the length of film advanced for filming of any given document corresponds to a whole multiple of a minimum pre-established length.

BRIEF DESCRIPTION OF THE DRAWINGS

Other characteristics and advantages of the invention will be more clearly evident from the description that follows, and from the enclosed drawings, in which.

DESCRIPTION OF THE PREFERRED EMBODIMENTS

Figures 1, 2:
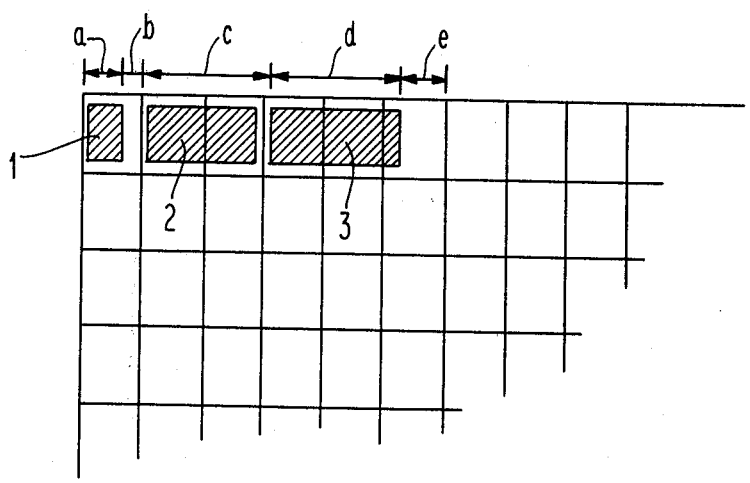
FIG. 1 shows an example of the standard photogram coordinate positions according to a typical microfiche arrangement.
FIG. 2 shows a portion of a microfilm jacket with microfilmed documents as filed in accordance with the system of this invention.

According to the present invention a minimum film length is pre-established for the feeding of film for flow microfilming, the distance chosen corresponds preferably to the length of the photogram of standard microfiche, i.e., the length "X" shown in FIG. 1. Each document is thus filmed beginning a distance equal to an integral multiple of X from a reference position, for example, the leftmost end of the fiche.

FIG. 1 shows a standard layout for a microfiche. It will be observed that 98 individually named positions are available on the fiche. Typically, when the fiche is created, an index is provided showing what document is located at each of the 98 denominated areas of the fiche so that upon a viewer's later desiring to access a particular document, he need only name the coordinates, e.g., "E8" and an automatic viewing machine will move the appropriate frame under a viewing lens. Alternatively, of course, the viewer himself can controllably move the fiche with respect to the lens to the desired position. It will be appreciated, however, that the operability of such a system requires that documents be confined to within the denominated reference areas and that if a flow or continuous microfilming system is used to film documents of varying length, this is unlikely to occur. Thus, even if a continuous microfilm is made of documents of varying lengths, cut into strips of a standard length and inserted into sleeves in a standard microfilm jacket, this cannot be automatically accessed as described above because there is no necessity of correspondence between the reference positions as indicated on the fiche layout 10 of FIG. 1 and the actual positions of the documents within the filled sleeves. According to the present invention, this difficulty is alleviated by providing a method of flow microfilming which insures that documents all begin at defined positions with respect to the reference coordinate locations shown on the fiche of FIG. 1. Then, if a document is too long, it simply extends over to the successive frame, which is readily detected by a viewer when later viewing the fiche. In this way, one can view documents of varying length simply by calling for the reference frame which contains the beginning of the document, which will appear on the directory or reference list.

This aim is accomplished according to the present invention by controlling the starting position of each copy and providing means to insure that filming continues for an integral number of standard minimum film lengths, such that all documents are filmed beginning at integral numbers of this minimum film length.

An example of the microfilming with the system of this invention is shown schematically in FIG. 2.

Microfilming of a document 1 having a length a (when reduced) less than the standard length X: As shown in FIG. 2, while the document covers length a, the film is advanced during the microfilming by a minimum distance X. As this is greater than the document length a, an unused space remains, having length b, such that $a+b=X$; this way it is evident that the following document—or at least its beginning—will coincide with the following standard position (A2) of the microfiche.

Microfilming of a document 2 having a length c (when reduced) equal to a whole multiple of the length X: In the case shown, the document's length c is equal to 2X, as shown in FIG. 2, so that document 2 covers two standard positions such as A2 and A3 (FIG. 1) without causing an access problem.

Microfilming of a document 3 having a length d when reduced greater than the standard length: As shown again in FIG. 2, when the document 3 covers a length d greater than, e.g., 2X and less than 3X, the film is advanced during microfilming by a length 3X, leaving the space e unused, where $d+e=3X$.

After filming in this way the film can be cut into strips of standard length and inserted into jackets, whereby the jacket prepared with the above described system can be read by an automatic microfiche reader, because the position of a photogram of a document referred to in an index will always include at least the beginning of such document, independent of the length of such document or of the documents which precede it, so that the first "frame" of a multiple frame document can be selected by the machine.

Figure 3:
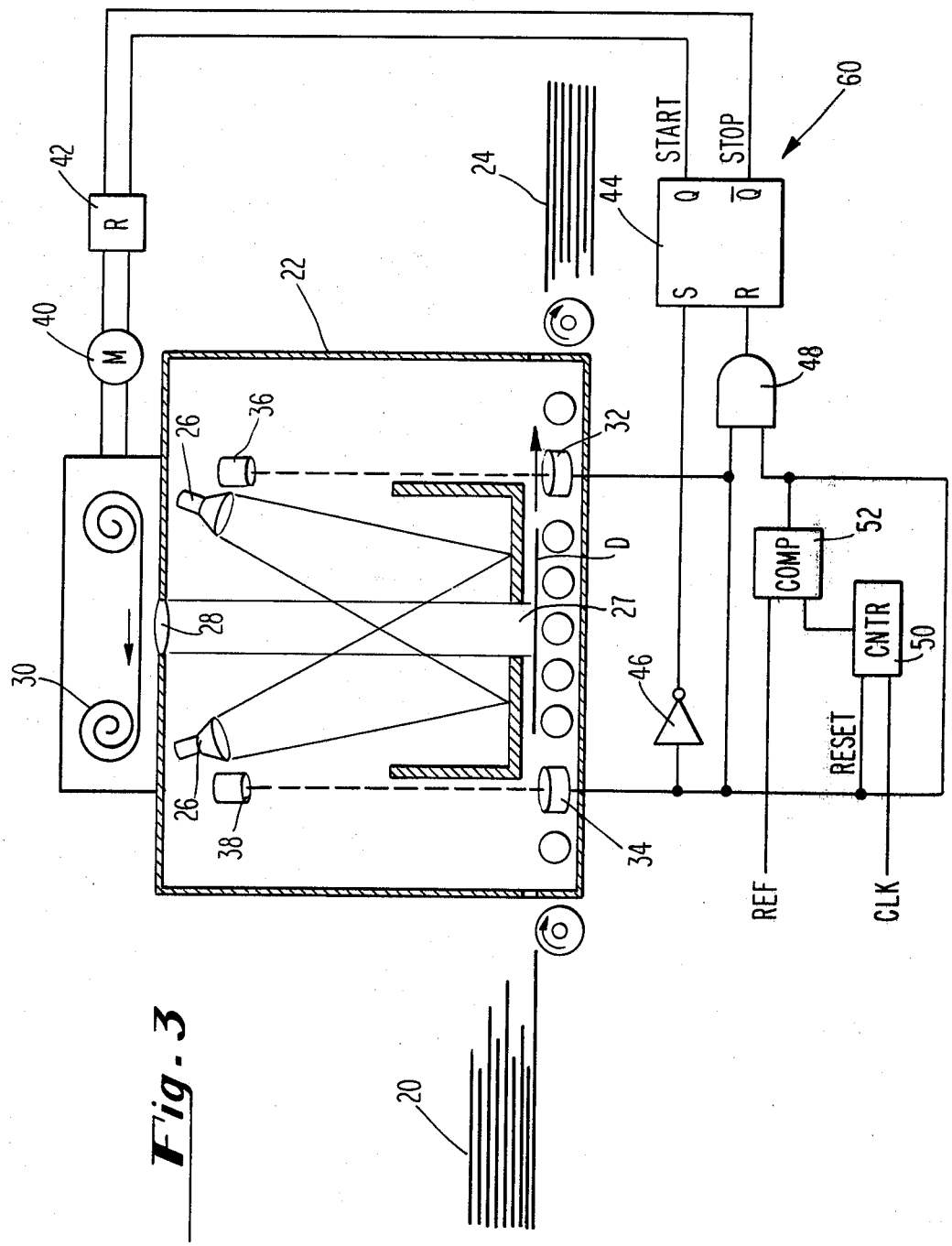
FIG. 3 shows a schematic view of a flow microfilming apparatus according to the invention.

FIG. 3 shows a schematic view of a flow microfilming machine for practicing the process of the invention. A stack 20 of documents of varying length is shown being fed in at the left side of the machine, being filmed in an exposure chamber 22 and stacked in a second stack 24 after filming. Lamps 26 in the filming chamber 22 provide illumination for the continuous flow microfilming process, according to which documents are fed into the exposure chamber 22, in which the image seen through a slit 27 is focused by a lens 28 onto a film 30. The film is advanced continuously by a motor 40 operated by a relay 42, operated in turn by motor start and motor stop signals passed to it from control circuitry indicated generally at 60. The motor control circuitry 60 is operated in accordance with signals output by photocells 32 and 34 which are supplied with light beams from sources 36 and 38. The beams are interrupted by passage of the documents through the exposure chamber 22, and control the film motor as follows. When a document indicated at D interrupts the light beam connecting source 38 with photocell 34, this is a signal that a document has entered the filming chamber and filming should begin. Accordingly, the photocell signal 34, which goes low when the document interrupts the light beam, is inverted by an inverter 46 and passed to the SET input of a flip-flop 44, outputting the START signal and causing the relay 42 to start the motor 40. The signal output by photocell 34 is also passed to an AND gate 48, and is also used to reset a counter 50 which is supplied with a clock signal. Accordingly, the clock signal is counted in the counter 50 and the magnitude of the count in the counter 50 at any given time is an indication of the length of time the motor has been running.

The counter output is passed to a comparator 52 which is supplied with a reference signal. Accordingly, whenever the count supplied to the comparator 52 by the counter 50 is equal to the reference signal, the comparator 52 outputs a signal to the AND gate 48, which signal is indicative that the film is presently positioned at one of the standard starting positions. If the other output to the AND gate 48—that is, the signal from the photocell 34—is also high, the output of AND gate 48 is high indicating that no document is being filmed and that the film has reached the beginning of one of the standard coordinate-defined locations. Accordingly, the RESET input of the flip-flop 44 is high, and the motor 40 is stopped. On the other hand, if the signal output of comparator 52 goes high while a document more than one frame long is still being filmed, the other input to the AND gate 48—again, the signal from photocell 34—is low, so that the output of AND gate 48 remains low. Accordingly, the motor 40 continues to run. The counter 50, however, is reset by the comparator's output going high, thus indicating that an end of frame has been passed and a new one has begun. The output of the second photocell 32 is also connected to the AND gate 48 so that if its signal is high, indicating that no document is present, and the comparator output indicates that an integral number of frames has passed, the motor stops.

It will be understood, however, that the invention is not limited to the particular illustrated manner of operation but that many other practical forms could be devised without going out of the scope of the invention.

In particular, the invention could be used to provide a unitary diazo-type single microfilm with reduced size copies of documents of varying length by performing successive filming operations beginning at predetermined index locations upon the fiche, thus enabling documents of varying lengths to be run upon an automatic fiche accessing machine. Accordingly, the above description of the invention should not be considered as a limitation on its scope but merely as exemplary of a preferred embodiment thereof. The scope of the invention is to be determined by that of the following claims.

I claim:

1. Apparatus for photographing documents onto microfilm comprising means for advancing the document to be microfilmed, means for advancing the microfilm, synchronization means for control of the movement of the film and document, whereby said film advancement is begun with introduction of the document, means for producing a signal at the termination of the document, means to measure the length of the moved forward film and means for control of the advancement of the film after the production of said signal, such that the film is advanced in lengths corresponding to whole multiples of a pre-established minimum length.

* * * * *